(12) United States Patent
Brousseau et al.

(10) Patent No.: US 11,803,600 B2
(45) Date of Patent: *Oct. 31, 2023

(54) SYSTEMS AND METHODS FOR INTELLIGENT CONTENT FILTERING AND PERSISTENCE

(71) Applicant: Open Text SA ULC, Halifax (CA)

(72) Inventors: Martin Brousseau, Mont-saint-Hilaire (CA); Steve Pettigrew, Montreal (CA)

(73) Assignee: Open Text SA ULC, Halifax (CA)

( * ) Notice: Subject to any disclaimer, the term of this patent is extended or adjusted under 35 U.S.C. 154(b) by 1 day.

This patent is subject to a terminal disclaimer.

(21) Appl. No.: 17/510,583

(22) Filed: Oct. 26, 2021

(65) Prior Publication Data

US 2022/0043874 A1   Feb. 10, 2022

Related U.S. Application Data

(63) Continuation of application No. 15/988,526, filed on May 24, 2018, now Pat. No. 11,163,840.

(51) Int. Cl.
| | | |
|---|---|---|
| *G06F 17/00* | (2019.01) | |
| *G06F 16/9535* | (2019.01) | |
| *G06F 16/955* | (2019.01) | |
| *G06F 40/30* | (2020.01) | |
| *G06F 40/295* | (2020.01) | |

(52) U.S. Cl.
CPC ...... *G06F 16/9535* (2019.01); *G06F 16/9558* (2019.01); *G06F 40/295* (2020.01); *G06F 40/30* (2020.01)

(58) Field of Classification Search
CPC ............ G06F 16/9535; G06F 16/9558; G06F 16/951; G06F 40/295; G06F 40/30; G06F 40/216

See application file for complete search history.

(56) References Cited

U.S. PATENT DOCUMENTS

| | | | | |
|---|---|---|---|---|
| 10,162,900 | B1 * | 12/2018 | Chatterjee | G06F 16/334 |
| 10,430,806 | B2 * | 10/2019 | Chang | G06Q 30/0201 |
| 11,163,840 | B2 * | 11/2021 | Brousseau | G06F 16/951 |
| 2002/0032740 | A1 * | 3/2002 | Stern | G06F 16/951 |
| | | | | 707/999.01 |
| 2006/0112110 | A1 * | 5/2006 | Maymir-Ducharme | |
| | | | | G06F 16/313 |
| | | | | 707/E17.084 |

(Continued)

*Primary Examiner* — Greta L Robinson
(74) *Attorney, Agent, or Firm* — Sprinkle IP Law Group

(57) ABSTRACT

A source content processor receives content from a crawler and calls a text mining engine. The text mining engine mines the content and provides metadata about the content. The source content processor applies a source content filtering rule to the content utilizing the metadata from the text mining engine. The source content filtering rule is previously built based on at least one of a named entity, a category, or a sentiment. The source content processor determines whether to persist the content according to a result from applying the source content filtering rule to the content and either stores the content in a data store or deletes the contents from the data ingestion pipeline such that the content is not persisted anywhere. Embodiments disclosed herein can significantly reduce the amount of irrelevant content through the data ingestion pipeline, prior to data persistence.

20 Claims, 4 Drawing Sheets

(56) References Cited

U.S. PATENT DOCUMENTS

2007/0208716 A1\* 9/2007 Krishnaprasad ...... G06F 16/951
2014/0372483 A1\* 12/2014 Marmanis ............. G06F 16/951
                                                        707/776

\* cited by examiner

SYSTEMS AND METHODS FOR INTELLIGENT CONTENT FILTERING AND PERSISTENCE

RELATED APPLICATION(S)

This application is a continuation of, and claims a benefit of priority under 35 U.S.C. 120 of, U.S. patent application Ser. No. 15/988,526 filed May 24, 2018, issued as U.S. Pat. No. 11,163,840, entitled "SYSTEMS AND METHODS FOR INTELLIGENT CONTENT FILTERING AND PERSISTENCE," which is hereby incorporated herein for all purposes.

TECHNICAL FIELD

This disclosure relates generally to text feature extraction and content analytics. More particularly, this disclosure relates to systems, methods, and computer program products for improving a data ingestion pipeline with intelligent content filtering, useful for an artificial intelligence and advanced analytics platform.

BACKGROUND OF THE RELATED ART

Today's enterprises are continuously bombarded with massive amounts of data (e.g., unstructured digital content) from disparate sources. In many scenarios, enterprises utilize text feature extraction and content analytics technologies to make sense and make use of such content.

Content analytics refers to the act of applying business intelligence (BI) and business analytics (BA) practices to digital content. Enterprises use content analytics software to gain insight and provide visibility into the amount of enterprise content that is being created, the nature of that content, and how it is used, for instance, in an enterprise computing environment.

Content analytics software such as OpenText™ Content Analytics, which is available from Open Text, headquartered in Canada, can provide many benefits, including creating machine-readable content from unstructured content, extracting content from unstructured content, discovering valuable factual information from unstructured content, and so on.

While existing content analytics software can be quite powerful and useful in many applications, they may not scale well due to how data is ingested and stored for use by the content analytics software. That is, the scalability of existing content analytics software, in some cases, can be limited by the scalability of the underlying databases where content under analysis is actually stored. Consequently, there is room for innovations and improvements in the field of content analytics.

SUMMARY OF THE DISCLOSURE

Embodiments disclosed herein provide innovations and improvements in the field of content analytics. An object of the invention is to provide a technical solution that can significantly reduce the amount of source content while the source content is being processed in a data ingestion pipeline, prior to the source content is persisted into a repository or data store for content analytics. An effect of this size reduction is that the time required to identify what content should be kept (e.g., for relevancy and/or compliance reasons, which can also reduce legal risk) can also be significantly reduced.

In some embodiments, this object can be realized by improving the data ingestion pipeline with a new source content processor or module. The source content processor includes control logic and source content filtering rules and works in conjunction with crawler(s) and a text mining engine. A crawler crawls data from disparate data sources and provides the data to the source content processor. The source content processor calls the text mining engine with the data. In turn, the text mining engine performs various text mining functions (e.g., concept extraction, entity extraction, categorization, sentiment analysis, etc.) on the data. The text mining engine outputs a variety of metadata describing the data. The source content processor receives the metadata from the text mining engine and is operable to apply source content filtering rules to the data utilizing the metadata from the text mining engine and determine whether to persist the data, drop the data, or direct the data to another computing facility or storage (e.g., a dump file). In some embodiments, the source content processor is further operable to determine where to persist the data.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
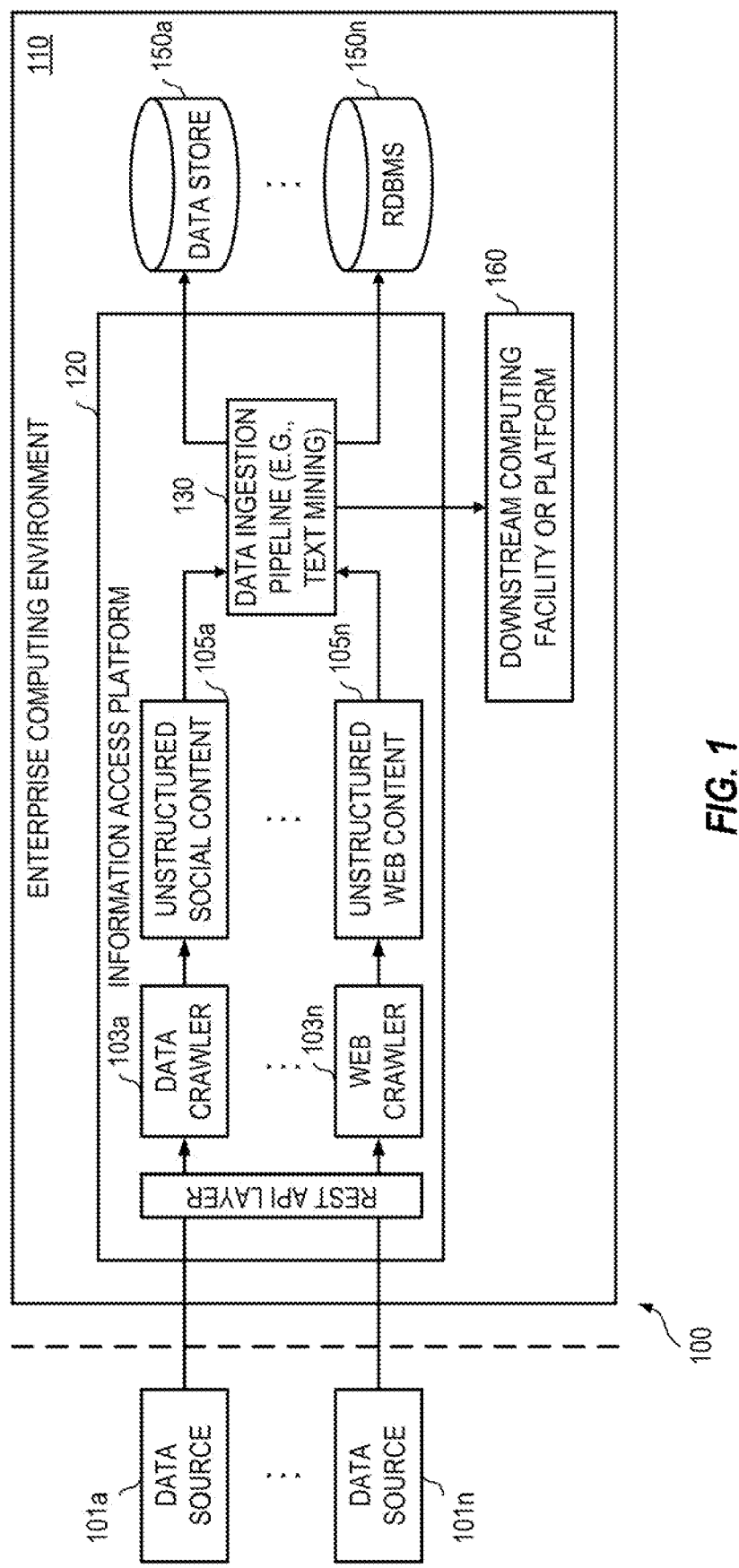
FIG. 1 depicts a diagrammatic representation of an example enterprise computing environment where embodiments disclosed herein can be implemented.

FIG. 1 depicts a diagrammatic representation of an example enterprise computing environment where embodiments disclosed herein can be implemented. FIG. 1 shows an example of a network computing environment 100 where an enterprise computing environment 110 is communicatively connected to a variety of disparate internal and/or external data sources 110a, . . . , 110n. Examples of data sources may include social media applications, websites, intranet sites, enterprise repositories, etc. Examples of social media applications may include Twitter, Facebook, LinkedIn, etc. Websites can include any web server hosting a website on the Internet. Examples of an enterprise content source can include an Enterprise Information Management (EIM) system, a content server, an enterprise content management (ECM), an enterprise fileshare, etc. Other sources of data may also be possible (e.g., Internet of Things (IoT) devices).

Various crawlers 103a, . . . , 103n (e.g., data crawler, web crawler, repository crawler, etc.) may be utilized to gather a variety of data (e.g., unstructured social content 105a, . . . , unstructured web content 105n, etc.) from disparate data sources 110a, . . . , 110n. In the example of FIG. 1, crawlers 103a, . . . , 103n are part of a special computing platform referred to herein as an information access platform 120. Information access platform 120 comprises information access software, including a data ingestion pipeline 130, specifically designed for EIM that provides enterprises with a new and dramatically improved approach to discover, analyze, and act on enterprise information.

In some cases, information access platform 120 can be responsible for content extraction (e.g., from ECMs, Web or Social media), transformation, enrichment, and persistence of metadata into a data repository, a relational database management system (RDBMS), etc. (e.g., data store 150a, RDBMS 150n, referred to herein as data stores) and/or to a downstream computing facility or platform (e.g., an enterprise search platform 160). A suitable data store might be a centralized data store that can be used to store data in an enterprise ranging from raw data to transformed data that can then be used for various tasks, including visualization, analytics, machine learning (ML), and reporting. Such a data store can facilitate the collocation of data in various schemata and structural forms, including structured data from relational databases (in rows and columns), semi-structured data (e.g., in various file formats such as comma-separated values (CSV), logs, Extensible Markup Language (XML), JavaScript Object Notation (JSON), etc.), unstructured data (e.g., emails, documents, portable document formatted (PDF) files, etc.), binary data (e.g., images, audio, video, etc.), and so on.

Metadata made available by information access platform 120 from data gathered from disparate data sources can be leveraged by other computing facilities in enterprise computing environment 110 such as a scalable analytics and data visualization platform and a big data analytics (BDA) platform for visualization and advanced analytics. OpenText™ Information Hub (iHub), available from Open Text, is an example of a scalable analytics and data visualization platform. iHub is a web-based application that enables a user to design, deploy, and manage secure, interactive web applications, reports, and dashboards fed by multiple data sources. OpenText™ Big Data Analytics is an example of a BDA platform that provides an all-in-one advanced analytics software appliance built for enterprise analysts looking for an easier way to access, blend, explore, and analyze all of their data quickly without depending on Information Technology (IT) or data experts. In some embodiments, enterprise computing environment 110 may further include an advanced analytics system, a comprehensive query and reporting system, and a developer platform for data scientists. Data scientists can consume data stored in a data store to train, validate, and use models (e.g., ML based models and some particular purpose models). For example, a data scientist can consume data stored in a data store to train, validate, and use a model to gain insight on consumer opinion on a product, useful for customer experience management (CEM) in understanding customer behavior, grouping, targeting, messaging, etc.

As illustrated in FIG. 1, a crawler running on information access platform 120 can be configured for communicating with a social media application data source through a REST application programming interface (API) layer to obtain and/or receive unstructured content (e.g., unstructured social media content 105a). Unstructured content from a social media application data source can include posts, comments, likes, images, links, or any content (whether it is automatically generated content or user generated content). Accordingly, unstructured social media content 105a can have disparate formats.

In the example of FIG. 1, another crawler running on information access platform 120 can be configured for communicating with a website server through the REST API layer to obtain and/or receive unstructured web content from the Internet. Unstructured web content 105n can also have disparate formats. Other crawlers are also possible and can be readily added (e.g., by adding a plug-in particular to the data type such as transcribed voice data), making information access platform 120 flexible and extensive with regard to data sources and types and not limited to social media or websites on the Internet.

The unstructured content (from various input sources and in different formats) is provided to data ingestion pipeline 130 for processing, which can include content extraction, content transformation, and content enrichment. In some embodiments, data ingestion pipeline 130 processes text data separately and differently from numerical information. For example, meaning or sentiment can be extracted or derived from text data (e.g., a text string of 140 characters or less), while an approximation numerical analysis can be performed on numerical information. In some embodiments, data ingestion pipeline 130 can decompose input data of various types from disparate data sources into a single common data model and persist the processed data in, for example, a central repository (e.g., data store 150a). The central repository and the common data model can be accessible by other systems and/or services (not shown) running in enterprise computing environment 110, including an advanced analytics system, a comprehensive query and reporting system, and a directory service such as the OpenText™ Directory Service. For example, the common data model can be used to map both unstructured and structured data. This enables the advanced analytics system to build and train data models for predictive analytics using ML, with unstructured and structured data as input data. The common data model defines how textual content would come in and be placed alongside numerical data and how they are related to each other. Through the developer platform, a data scientist may augment and/or incorporate features into the common data model, potentially mutating and/or modifying the common data model depending on the kind of analysis and/or modeling that they are building.

Although not shown in FIG. 1, the advanced analytics system can include a frontend user interface (UI) configured for end users, an administrative UI configured for system administrators, visual data mining and predictive analysis applications, and APIs for the UIs and applications (e.g., web service APIs for delivering analytics software as web services, REST APIs for the UIs, etc.). Additionally, the advanced analytics system can include a database (DB) API to columnar database algorithms for accessing unstructured and structured data persisted in proprietary columnar databases in the central repository. The advanced analytics system can additionally include a gateway to a cluster-computing framework such as Apache Spark. Apache Spark requires a cluster manager and a distributed storage system. Apache Hadoop software framework can be used for distributed storage and processing of datasets of big data. Skilled artisans appreciate that "big data" refers to data sets that are so voluminous (e.g., hundreds or more gigabytes of data) and complex (and sometimes that grow rapidly) that traditional data processing software is inadequate to process them. For example, conventional columnar databases could not scale to allow processing of large amounts of data. In order to have certain big data analytics features (which will not run on the Spark (Parquet) database format) run on the datasets, the datasets may first be translated from the Parquet database format to a proprietary columnar database format.

The distributed storage system is accessible by the comprehensive query and reporting system which can include a visual wizard for data queries, a report sharing (and saving) function, administrative services, and encyclopedia services. These services and functions allow high volumes of users to design, deploy, and manage secure, interactive web applications, reports, and dashboards fed by multiple data sources (e.g., data sources $101a, \ldots, 101n$). The comprehensive query and reporting system can include integration APIs that enable analytic content to be embedded in any application and displayed on any device communicatively connected to enterprise computing environment 110. These services and functions can be used by data scientists to gain insights on data gathered from multiple data sources.

As discussed above, various crawlers $103a, \ldots, 103n$ (e.g., data crawler, web crawler, repository crawler, etc.) can be utilized by information access platform 120 to gather a variety of data (e.g., unstructured social content $105a, \ldots,$ unstructured web content $105n$, etc.) from multiple disparate data sources $110a, \ldots, 110n$. In some embodiments, the data crawler is configured for communicating with a social media application data source (e.g., Twitter) utilizing a public API provided by the social media application data source (e.g., a Twitter API for getting a batch of up to seven days of tweets, a Twitter streaming API for getting tweets in near real time, etc.). In some embodiments, the web crawler is capable of crawling websites on the Internet with a high volume of content or for a large number of websites in parallel. In some embodiments, the web crawler can be a HTTP crawler, preferably based on an industry standard like Nutch. Apache Nutch is a highly extensible and scalable open source web crawler software project. Any suitable web crawler can be plugged into information access platform 120 to crawl and send content from the web to data ingestion pipeline 130.

Accordingly, data ingestion pipeline 130 can ingest social media content, website content, and enterprise content of very disparate nature and provide very rich metadata (e.g., location, country, language, context, concepts, entities, semantic information, categories, etc.) that can be available for analysis (by machines, data scientists, analysts, developers, etc.). Information access platform 120 implements a flexible metadata schema or set of attributes that it can publish from content (e.g., documents). Information access platform 120 is operable to segregate information by source/protocols or application identifier. Depending on use cases, information access platform 120 may store the metadata to an RDBMS (e.g., through an adapter that is based on a data ingestion pipeline API), a data store, a search platform (e.g., Solr), or a downstream computing, etc.

As described above, ingested and persisted data is accessible for consumption by downstream computing facilities in enterprise computing environment 110 (e.g., by the advanced analytics system for advance modeling, by the comprehensive query and reporting system for BI analytics, etc.). However, before the data can be consumed, a significant amount of effort is needed. One reason is that the size of the data from data ingestion pipeline 130 can be enormous. Skilled artisans appreciate that the number of Internet pages along can be extremely large. Another reason is in the complexity of the data due to the very disparate nature how the data were first created, by whom and/or what, and for what purpose.

Further complicating the matter is that data sources typically do not allow crawlers to use their search capabilities. For example, search engines on the Internet are programmed to allow only humans to utilize their search capabilities and have rules to prevent web crawlers, Internet bots, spiders, etc. to run search queries. Further, some websites may include a "robots.txt" file which informs a web crawler that it may only index only a part of a website, or none at all. This means that crawlers $103a, \ldots, 103n$ are not able to search for relevant data and gather only relevant data for enterprise computing environment 110. Instead, crawlers $103a, \ldots, 103n$ gather data in a wholesale manner and it is mostly left to data scientists, analysists, etc. to determine what data is relevant and separate irrelevant data from relevant data, before any analysis can be applied. An exception here is Twitter, which allows a crawler to use hashtags to collect tweets containing those hashtags.

"Relevancy," in this context, can be very important. For example, suppose an analysis is to determine consumer reactions to a new product by a company. Further suppose the product name contains a commonly used word such as a fruit. A search for the product through a traditional search engine likely returns results containing both the product and the fruit. However, search results concerning the fruit are not relevant to the purpose of the analysis. Since the fruit is a more common occurrence than the new product, the search results returned by the search engine may largely pertain to the fruit and thus are irrelevant data. For the analysis to produce a more accurate result (e.g., a measure of consumer reactions to the new product), such irrelevant data would need to be filtered out. As a non-limiting example, this can mean about 50,000 documents per month that need to be manually reviewed and cleaned up. This can be a time consuming, error-prone, and tedious task for a data scientist (or any human). It also takes away the precise time when the data scientist could be focusing instead on getting insights from the relevant data.

Today, more advanced search engines can return somewhat relevant search results based on keywords. Thus, once the data is persisted (e.g., in a RDBMS, a repository, or data store, etc.), a data scientist could utilize a search tool to help sorting through mountains of datasets in the persisted data. Unfortunately, keywords along are not enough to achieve high relevancy (e.g., higher than 90%). Thus, a data scientist may need to run through a plurality of tools to understand the subject of data that they are reviewing. To this end, it can be very desirable to be able to target a precise type of content (e.g., content relevance) upstream from content analytics, preferably before any data is persisted, so that data scientists can focus on getting insights from data that is highly relevant to that precise type of content. A technical advantage is that the amount of data that needs to be persisted can be significantly reduced, which can lower the cost and size of data storage.

From the perspective of enterprise computing environment 110, this means creating a content relevancy targeting and cleaning process within information access platform 120 and reusing semantic metadata generated by a text mining engine and assigned to content or related to a domain (e.g., a website). Because the content relevancy targeting and cleaning process is closer to data sources 101a, ..., 101n and takes place before outputs from data ingestion pipeline 130 are persisted in data stores 150a, ..., 150n, it is referred to herein as "source content filtering." Because it occurs within data ingestion pipeline 130, it is also referred to herein as "ingestion filtering."

Before describing source content filtering further, it might be helpful to highlight some differences between text mining and content analytics, both of which are in the field of national language processing (NLP). Those skilled in the art will appreciate that text mining is performed at the document level to infer and extract information from unstructured textual content and to add metadata to the unstructured textual content. Content analytics is performed at the multi-document level to extract insights from unstructured textual content. Content analytics leverages semantic metadata, which were added using text mining, to discover insights, patterns, and trends from large amount of textual content. In this context, these semantic metadata are "reused" because source content filtering also uses them to make decisions. However, process-wise, source content filtering actually uses these semantic metadata first (e.g., upstream from content analytics) to determine whether to persist or exclude a piece of content (e.g., a post, a tweet, a document, a file, etc.). If the piece of content is important (e.g., is relevant to an event, topic, subject, theme, or analysis of interest, as discussed below), it is persisted. Content analytics can then be performed at the multi-document level to extract insights from the persisted content.

With source content filtering, data ingestion pipeline 130 can filter out content using source content filtering rules to detect certain kinds of information from various sources and then exclude or persist the detected information. This way, content can be better managed and used by a downstream computing facility such as the advanced analytics system. As a non-limiting example, source content filtering may detect and persist approximately 500 highly relevant documents, as opposed to 50,000 documents without source content filtering. To this end, in some embodiments, data ingestion pipeline 130 is enhanced with a source content processor or module configured for performing source content filtering. An example of a source content processor is illustrated in FIG. 2.

Figure 2:
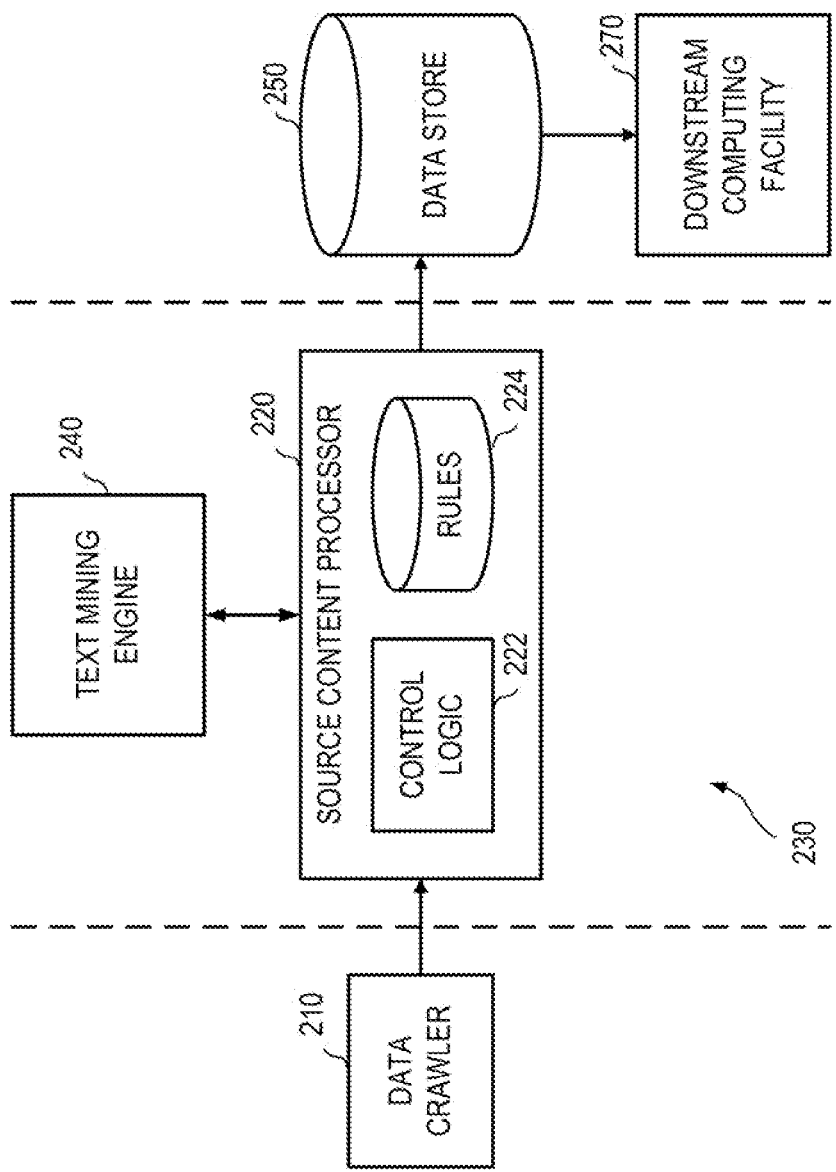
FIG. 2 depicts a diagrammatic representation of an example of a source content processor communicatively connected to a crawler and a text mining engine according to some embodiments.

FIG. 2 depicts a diagrammatic representation of an example of a source content processor 220 communicatively connected to a crawler 210 and a text mining engine 240 according to some embodiments. Crawler 210 can be an example of a crawler described above (e.g., crawlers 101a, ..., 101n). In this example, source content processor 220 is communicatively connected to a data store 250. Data store 250 can be an example of a data store described above (e.g., data stores 150a, ..., 150n). Data stored in data store 250 can be accessible by a downstream computing facility 270. Downstream computing facility 270 can be an example of a service or system in enterprise computing environment 110 described above with reference to FIG. 1.

Crawler 210 can implement heuristics that define what content to gather from where. For example, crawler 210 can be programmed to access certain universal resource locators (URLs) and/or avoid (e.g., access but not download) aggregation pages (e.g., a page containing a list of articles, instead of the articles themselves). In this way, crawler 210 can gather actual content from data sources of interest. With text mining, it is possible to separate content extracted from the web and social media data sources for different specific purposes of analyses (e.g., for a new product, an event, a theme, a topic, etc.). However, this is usually done after the content is persisted as there is not really a precise way for crawler 210 to segregate content from its source. This is because, as discussed above, most data sources prevent crawlers like crawler 210 to search within a website or social media application for specific content. Further, most web search engines do not allow any crawlers to leverage their search results. Thus, crawler 210 is not able to crawl a result of a search engine.

To separate content extracted from the data sources for different specific purposes and selectively persist only those relevant to such purposes, in some embodiments, source content processor 220 can be defined as part of a crawling job configuration for crawler 210. Other implementations are also possible. For example, as shown in FIG. 2, source content processor 220 can be part of data ingestion pipeline 230 which includes text mining engine 240. Further, there can be multiple source content processors, each for a particular purpose, a crawler, or data source. Accordingly, FIG. 2 is meant to be exemplary and non-limiting.

Source content processor 220 can be particularly configured for determining what semantic metadata (or insights) that need to be present and detected in a piece of content (e.g., a tweet, a post, a document, etc.) for this piece of content to be taken into account and made available (e.g., persisted in data store 250) for analysis. This has a technical effect of significantly reducing the amount of irrelevant content being extracted from data sources so that only highly relevant content is persisted for analysis.

To illustrate this effect, suppose a tracking site "the G7 Summit Tracker" is powered by information access platform 120. A challenge here for information access platform 120 is to reduce the amount of irrelevant content being extracted from the web and social media (e.g., news sites, Twitter, etc.). Previously, all content from these data sources needs to be extracted, processed, and persisted before a content analyst/data scientist can figure out, based on semantic metadata provided by the text mining engine of information access platform 120, what are the relevant documents for the event targeted by this analysis (the "G7 Summit" in this example). This need increases the volume of content being persisted and the effort needed to segregate data downstream before a content analyst/data scientist can extract insights from the data using analytical tools provided by enterprise computing environment 110 such as algorithms and visualization.

To reduce the volume of content being persisted and the effort needed to segregate data downstream before a content analyst/data scientist can extract insights from the data, source content processor 220 can, earlier in the process, apply source content filtering rules 224 to the data based on semantic metadata provided by text mining engine 240. For example, if text mining engine 240 does not extract "G7 Summit" as an event for a document, source content processor 220 can determine that the document will not be processed further (because it is not considered to be relevant to the event "G7 Summit"). Accordingly, the document will not be persisted. As a non-limiting example, this can mean that the document is dropped and not indexed into a search engine (e.g., Solr). Optionally, source content processor 220 can direct the document (which contains non-indexed, non-structured data) to another computing facility or storage (e.g., a dump file) and may keep a link to it.

While source content processor 220 can be configured for identifying important documents for specific use cases, in some embodiments, source content processor 220 leverages outputs provided by text mining engine 240 to determine whether a piece of content is or is not to be persisted for analysis. More specifically, control logic 222 of source content processor 220 is operable to apply source content filtering rules 224 to a piece of content based on metadata (e.g., semantic data) determined by text mining engine 240 as describing the piece of content. In some embodiments, this may entail control logic 222 of source content processor 220 access a source content filtering rules database storing source content filtering rules 224 and retrieve a source content filtering rule or rules from the source content filtering rules database based on a type or types of the metadata provided by text mining engine 240. As a non-limiting example, a source content filtering rule can specify: if event="G7 Summit" then persist="TRUE." In this example, "event" is a piece of metadata (e.g., a named entity) and its value "G7 Summit" is determined by text mining engine 240. The source content filtering rule is applicable to this type of metadata.

In practice, it is possible that a piece of content itself may or may not contain the actual word or phrase of interest. For example, suppose someone tweets about a new product "ABC" and then refers to "the product" in subsequent tweets. For human readers, it can be quite obvious that the subsequent tweets are about the same product "ABC." However, because the subsequent tweets do not contain the name of the product "ABC," they may be omitted by a keyword matching or pattern matching technique. Likewise, in the "G7 Summit" example above, a piece of content may not literally spell out "G7 Summit," but may instead describe "G7 leaders." Indeed, there can be many variations, synonyms, acronyms, forms, and so on, to a word, phrase, or meaning, in the same language or different languages. Further, as discussed above, keyword matching and pattern matching are not precise filtering techniques. For example, even if a data source allows crawler 210 to query their search engine and crawl the results provided by the search engine, searching for content containing the word "apple" will indiscriminately return all content from the data source containing "apple," even if the purpose for the search was about a computer company and not the fruit.

To address these and other issues, text mining engine 240 provides a powerful multilingual advanced text mining solution that processes textual documents and performs linguistic engineering, data mining, and machine learning to extract information in a meaningful and intelligent way. Text mining engine 240 is operable to perform a plethora of text mining techniques, including conception extraction, entity extraction, categorization, sentiment analysis, summarization, etc.

For conception extraction, text mining engine 240 is operable to extract key concepts, including complex concepts. In some embodiments, concepts are identified with an algorithm based on linguistic and statistical patterns (e.g., keywords and key phrases). These can include the most relevant noun(s) and phrase(s) for a given purpose. The extracted concepts can be weighted ranked such that, in some embodiments, they are outputted with relevancy ranking.

For entity extraction, text mining engine 240 is operable to extract named entities. For instance, suppose a document describes that a specific company is releasing a new product. Based on linguistic rules and statistical patterns, text mining engine 240 can extract the company's name, the new product name, etc. from the document. All occurrences of an entity type may be extracted. For synonyms, acronyms, and variations thereof, an authority file may be used. An authority file refers to a controlled vocabulary of terms and cross-reference terms that assists entity extraction to return additional relevant items and related metadata (e.g., geopolitical locations, person names, organization names, trademarks, events, etc.). There can be multiple authority files, each for a particular controlled vocabulary of terms and cross-reference terms. Output from entity extraction can be a list of extracted entities with attributes and relevancy ranking. Since, as discussed above, text mining is performed at the document level, the extracted metadata (e.g., the company's name and the new product name in this example) can be used to enrich the document. In some embodiments, text mining engine 240 can learn how to determine an entity based on previous examples from which a model has been trained using machine learning. For example, suppose multiple posts or tweets mention "the product" following a product name "ABC" mentioned in an earlier post or tweet, text mining engine 240 may learn from previous examples and determine to add an entity "ABC" for the product to the multiple posts or tweets, even if they do not explicitly contain "ABC."

For categorization, text mining engine 240 is operable to programmatically examine the text in a document and determine, according to a controlled vocabulary (a taxonomy—a scheme of classification), a best topic for the document and attach the topic to the document. For instance, a news article discusses that a president is going to visit a country. Text mining engine 240 is operable to programmatically examine the article, determine that this article concerns foreign affair and/or diplomacy, and add "foreign affair" and/or "diplomacy" as metadata (e.g., "category=foreign affair" or "topic=diplomacy") to the article, (even if the article itself does not literally contain "foreign affair" or "diplomacy"). Downstream from text mining, these pieces of metadata can be used in different ways for various reasons. In some embodiments, text mining engine 240 is capable of learning how to categorize new content based on previous examples from which a model has been trained using machine learning (e.g., using taxonomies, training sets, and rules grouped in a categorization knowledge base). There can be multiple categorization knowledge bases. Output from categorization can include a list of extracted categories with relevancy rankings and a confidence score rating for each category.

For sentiment analysis, text mining engine 240 is operable to programmatically examine a piece of content (e.g., a post, a document, a tweet, an article, etc.) in an even more fine-grained manner. For instance, for a given sentence in a document that describes a company releasing a new product, text mining engine 240 is operable to analyze the sentence and determine whether the sentiment for the totality of the sentence is positive, negative, or neutral. Since text mining engine 240 also extracts the company name and the product name, the sentiment or detected in a sentence by text mining engine 240 can be associated with an entity or entities (e.g., the company and/or the product) in the sentence. At the entity level, multiple instances of a given entity can be combined to assess an overall sentiment value for the entity. In this way, what the document says about the product (e.g., a positive tone, a negative tone, or a neutral tone) at various levels (e.g., at the document level, the sentence level, the entity level, etc.) can be captured and leveraged by a content analysis later (along with other documents relevant to the company and the product), for instance, for trend analysis, BI, and mood detection. In some embodiments, text mining engine 240 also leverages machine learning to learn how to determine a sentiment, for instance, by running a machine learning algorithm that utilizes input data and statistical models to predict an output value (e.g., a tone value).

For summarization, text mining engine 240 is operable to identify the most relevant sentences in a piece of content according to the categorization. For instance, sentences with the highest relevancy can be identified and extracted. This is a much more precise way to identify relevant content at the sentence level. Metadata determined from summarization can also be used in different ways downstream from text mining.

All the metadata thus determined by text mining engine 240 can be leveraged downstream from text mining, for instance, to improve search navigation and perform content analytics. For instance, if one is interested in finding out how many documents in millions of documents talk about diplomacy, an answer can be obtained right away, down to the sentence level, without anyone needing to dig in to all the details in the millions of documents.

Figure 3:
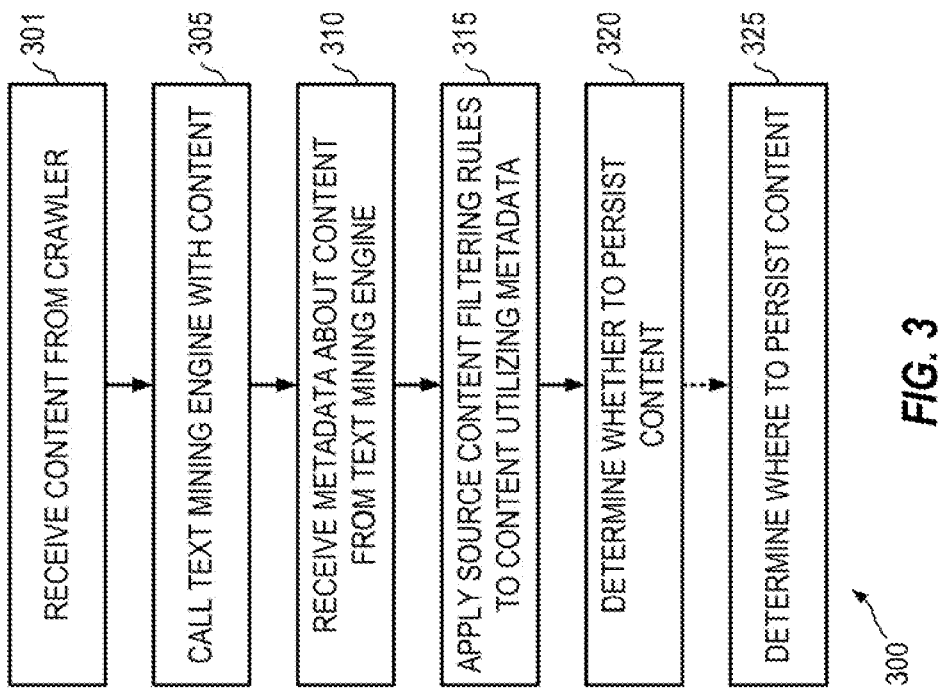
FIG. 3 depicts a flow chart illustrating a method for source content filtering according to some embodiments.

In embodiments disclosed herein, the metadata determined and extracted by text mining engine 240 can be leveraged for source content filtering before persistence. This is exemplified in FIG. 3, which depicts a flow chart illustrating a method for source content filtering according to some embodiments.

Method 300 may begin when a source content processor (e.g., source content processor 220 or, more precisely, control logic 222 of source content processor 220) receives from a crawler (e.g., crawler 210) content crawled from disparate data sources (301). The source content processor calls a text mining engine (e.g., text mining engine 240) to mine the raw, unstructured content from the crawler. While the content may be queued during this process (e.g., as a job queued up to be processed by the text mining engine), it is not yet indexed or persisted. The text mining engine is operable to perform various text mining functions described above (e.g., concept extraction, entity extraction, categorization, sentiment analysis, etc.) on the content and output a variety of metadata describing the content (e.g., concepts, named entities, categories, sentiments, etc.). At the document level, the text mining engine can provide information about what is being said in a document, what topic is the document, what entities are in the document, what the sentiment is at the document level, at the sentence level, at the entity level, and so on.

The source content processor receives the metadata from the text mining engine (310) and applies appropriate source content filtering rules (315). Application of source content filtering rules may depend on the metadata from the text mining engine. As an example, suppose a goal is to get information about everything that is negative about a product ABC. The crawler crawls various data sources about the product ABC and sends all the content about the product ABC from the data sources to the source content processor. The source content processor calls the text mining engine which performs entity extraction and a semantic analysis and which returns to the source content processor named entities (e.g., "product=ABC") and a sentiment (e.g., "tone=positive" or "sentiment=positive"). From these pieces of information (metadata) about the product ABC provided by the text mining engine, the source content processor can determine whether there is a bad totality about the product ABC in the content, for instance, by applying a source content filtering rule defined per the given goal. In this example, the goal is to find out everything that is negative about the product ABC, thus, a source content filtering rule may specify: if "product=ABC" and "tone=negative" then "persist=true". In this case, the content does not meet the source content filtering rule. Accordingly, a determination is made by the source content processor to drop the content (320). That is, in this example, the content that has a positive sentiment about the product ABC is not persisted because, even though the content is relevant to the product ABC, it is not relevant enough to the specified goal of finding out everything that is negative about the product ABC.

As the above example demonstrates, leveraging the metadata from the text mining engine, the source content processor can target very precise content (that is highly relevant to a given use case, goal, topic, subject, theme, analysis, purpose, etc.) prior to persistence and prior to content analytics. The level of precision targeting can be configurable. For instance, a source content filtering rule may specify: if "product=ABC" and ("tone=negative" or "tone=neutral") then persist. Following the above example, applying this source content filtering rule may cause the source content filter to persist both types of content (content that has a negative tone about the product ABC and content that has a neutral tone about the product ABC).

As described above, the text mining engine can provide a plurality of different types of metadata (e.g., named entities, categories, sentiments, etc.). Leveraging the knowledge of what metadata the text mining engine can provide, source content filtering rules can be built, stored (e.g., as source content filtering rules 224), and utilized by the source content processor to determine whether to persist or not to persist a piece of content, or to do something else with the piece of content (e.g., pushing it to another computing facility or storage). For example, suppose a data scientist is interested in analyzing all the articles published in the last ten years that talk about a particular politician (a named entity) when the topic is about foreign policy (a category) and when the sentiment is negative. The data scientist (or an administrator) can build a specific source content filtering rule that has these three semantic properties (or rule parameters): "if "named entity"="politician" and "category=foreign policy" and "sentiment=negative" then persist."

In some embodiments, when a piece of content passes such a source content filtering rule, the source content processor may further determine an appropriate destination for persisting the piece of content (325). For instance, the source content processor may check whether a data store is specified by the data scientist (e.g., a RDMBS, a data store, a content repository, etc., which can be part of the rule or via a separate check) and push the piece of content into the data store thus specified by the data scientist.

Content thus persisted can be highly relevant to a stated purpose and can be utilized by data scientists as well as automated solutions. Referring back to the tracking site example above, source content filtering can drastically reduce the amount of irrelevant content being extracted from the web and social media (e.g., news sites, Twitter, etc.) by specifically targeting content relevant to the "G7 Summit" (e.g., using a source content filtering rule specifying a named entity "G7 Summit") and persisting only content that meets this rule. In this way, the volume of content being persisted can be significantly reduced and the effort needed to segregate data downstream is virtually eliminated. Content analysts and data scientists alike no longer need to spend time and resources to clean up data and can focus their efforts in extracting insights from the already highly relevant, and much smaller in size, data. Likewise, automated analytical tools such as those in enterprise computing environment 110 can access the highly relevant data persisted in a data store and automatically perform analyses, data visualization, etc. that can then be accessed by end users using networked devices.

Accordingly, the source content filtering technology disclosed herein can drastically reduce the amount of non-structured data being processed through a data ingestion pipeline, gaining significant speed in data processing, and producing more relevant data for various purposes, for instance, for review by data scientists and/or for further computation, analysis, and visualization in a distributed computing environment.

Figure 4:
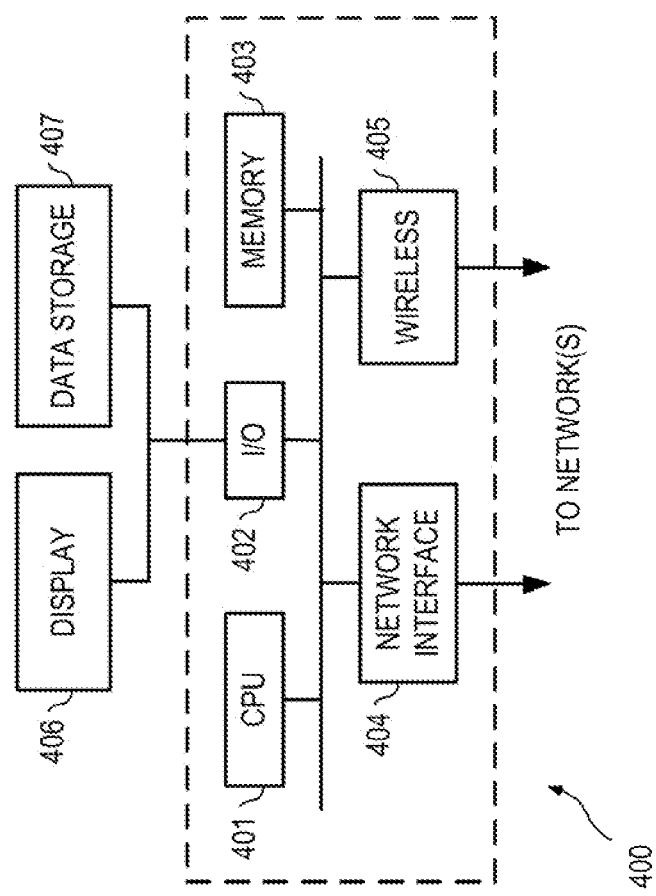
FIG. 4 depicts a diagrammatic representation of an example of a data processing system for source content filtering according to some embodiments.

FIG. 4 depicts a diagrammatic representation of an example of a data processing system for source content filtering according to some embodiments. As shown in FIG. 4, data processing system 400 may include one or more central processing units (CPU) or processors 401 coupled to one or more user input/output (I/O) devices 402 and memory devices 403. Examples of I/O devices 402 may include, but are not limited to, keyboards, displays, monitors, touch screens, printers, electronic pointing devices such as mice, trackballs, styluses, touch pads, or the like. Examples of memory devices 403 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 400 can be coupled to display 406, data storage 407 and various peripheral devices (not shown), such as printers, plotters, speakers, etc. through I/O devices 402. Data processing system 400 may also be coupled to external computers or other devices through network interface 404, wireless transceiver 405, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including Python, C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
  receiving, by a source content processor, content gathered based on heuristics defining content to be gathered from disparate data sources, the source content processor working in conjunction with a data ingestion pipeline running on a server machine, the source content processor communicatively connected to a data store, the server machine operating in an enterprise computing environment;
  prior to persisting the received content, calling, by the source content processor, a text mining engine with the received content;
  receiving, by the source content processor from the text mining engine, metadata that describes the received content;
  applying, by the source content processor, a source content filtering rule to the received content utilizing the metadata that describes the received content, wherein the source content filtering rule is previously built based on at least one of a named entity, a category, and a sentiment;
determining, by the source content processor, whether to persist the received content according to a result from the applying; and
responsive to a determination by the source content processor to persist the received content, storing the content in the data store.

2. The method of claim 1, further comprising:
accessing a source content filtering rules database; and
retrieving the source content filtering rule from the source content filtering rules database based on a type of the metadata.

3. The method of claim 1, wherein the metadata from the text mining engine comprise named entities, categories, and sentiments.

4. The method of claim 1, wherein the received content is received from one or more crawlers that crawl data from the disparate data sources.

5. The method of claim 1, wherein responsive to a determination by the source content processor not to persist the received content, the source content processor is operable to push the content to a file, generate a link to the file, and store the link.

6. The method of claim 1, wherein the data store comprises a relational database management system, a data store, or a content repository.

7. The method of claim 1, wherein responsive to a determination by the source content processor not to persist the received content, the source content processor deletes the content from the data ingestion pipeline such that the content is not persisted anywhere in the enterprise computing environment.

8. A system, comprising:
a processor;
a non-transitory computer-readable medium; and
stored instructions translatable by the processor to implement a source content filter for:
receiving content gathered based on heuristics defining content to be gathered from disparate data sources, the source content processor working in conjunction with a data ingestion pipeline running on the system, the source content processor communicatively connected to a data store;
prior to persisting the received content, calling a text mining engine with the received content;
receiving, from the text mining engine, metadata that describes the received content;
applying a source content filtering rule to the received content utilizing the metadata that describes the received content, wherein the source content filtering rule is previously built based on at least one of a named entity, a category, and a sentiment;
determining whether to persist the received content according to a result from the applying; and
responsive to a determination to persist the received content, storing the content in the data store.

9. The system of claim 8, wherein the stored instructions are further translatable by the processor to perform:
accessing a source content filtering rules database; and
retrieving the source content filtering rule from the source content filtering rules database based on a type of the metadata.

10. The system of claim 8, wherein the metadata from the text mining engine comprise named entities, categories, and sentiments.

11. The system of claim 8, wherein the received content is received from one or more crawlers that crawl data from the disparate data sources.

12. The system of claim 8, wherein the stored instructions are further translatable by the processor to perform:
responsive to a determination not to persist the received content, pushing the content to a file, generating a link to the file, and storing the link.

13. The system of claim 8, wherein the data store comprises a relational database management system, a data store, or a content repository.

14. The system of claim 8, wherein the stored instructions are further translatable by the processor to perform:
responsive to a determination not to persist the received content, deleting the content from the data ingestion pipeline such that the content is not persisted anywhere on the system.

15. A computer program product comprising a non-transitory computer-readable medium storing instructions translatable by a processor to implement a source content filter for:
receiving content gathered based on heuristics defining content to be gathered from disparate data sources, the source content processor working in conjunction with a data ingestion pipeline running on a server machine, the source content processor communicatively connected to a data store, the server machine operating in an enterprise computing environment;
prior to persisting the received content, calling a text mining engine with the received content;
receiving, from the text mining engine, metadata that describes the received content;
applying a source content filtering rule to the received content utilizing the metadata that describes the received content, wherein the source content filtering rule is previously built based on at least one of a named entity, a category, and a sentiment;
determining whether to persist the received content according to a result from the applying; and
responsive to a determination to persist the received content, storing the content in the data store.

16. The computer program product of claim 15, wherein the instructions are further translatable by the processor to perform:
accessing a source content filtering rules database; and
retrieving the source content filtering rule from the source content filtering rules database based on a type of the metadata.

17. The computer program product of claim 15, wherein the metadata from the text mining engine comprise named entities, categories, and sentiments.

18. The computer program product of claim 15, wherein the received content is received from one or more crawlers that crawl data from the disparate data sources.

19. The computer program product of claim 15, wherein the instructions are further translatable by the processor to perform:
responsive to a determination not to persist the received content, pushing the content to a file, generating a link to the file, and storing the link.

20. The computer program product of claim 15, wherein the instructions are further translatable by the processor to perform:
responsive to a determination not to persist the received content, deleting the content from the data ingestion pipeline such that the content is not persisted anywhere in the enterprise computing environment.

\* \* \* \* \*